United States Patent [19]
Johnson

[11] Patent Number: 5,966,125
[45] Date of Patent: Oct. 12, 1999

[54] SYSTEM AND METHOD FOR DYNAMIC CONTROLS

[75] Inventor: William J. Johnson, Flower Mound, Tex.

[73] Assignee: Environique, Inc., Flower Mound, Tex.

[21] Appl. No.: 08/763,218

[22] Filed: Dec. 10, 1996

[51] Int. Cl.⁶ ...................................................... G06F 3/00
[52] U.S. Cl. ............................................................ 345/348
[58] Field of Search ................................... 345/333, 334, 345/339, 349, 965, 966, 974, 977, 184; 364/188; 399/81; 361/190

[56] References Cited

U.S. PATENT DOCUMENTS

| | | | |
|---|---|---|---|
| 4,745,543 | 5/1988 | Michener et al. ........................ | 364/188 |
| 5,243,697 | 9/1993 | Hoeber et al. ............................ | 345/334 |
| 5,630,081 | 5/1997 | Rybicki et al. .......................... | 345/348 |
| 5,657,221 | 8/1997 | Warman et al. .......................... | 364/188 |
| 5,687,331 | 11/1997 | Volk et al. .............................. | 345/327 |
| 5,694,562 | 12/1997 | Fisher ...................................... | 345/349 |
| 5,739,809 | 4/1998 | McLaughlin et al. .................. | 345/150 |

FOREIGN PATENT DOCUMENTS 0274879  7/1988  European Pat. Off. .

*Primary Examiner*—A. Katbab
*Attorney, Agent, or Firm*—Felsman, Bradley, Vaden, Gunter & Dillon, LLP

[57] ABSTRACT

Provided is a dynamic control (dycon). A dycon is a conventional control coupled with a dedicated display means, coordinated by data processing. Preferably, the dedicated display means is affixed to the control. A dycon has one, and only one, dedicated display means which depicts information for only that particular dycon. A dycon's dedicated display means has one, and only one, mechanical control for which it displays meaning. Information displayed on the dedicated display means assigns a current meaning to the dycon. A dycon may have many meanings over a period of time as indicated by the many variations in what is displayed for the dycon.

18 Claims, 9 Drawing Sheets

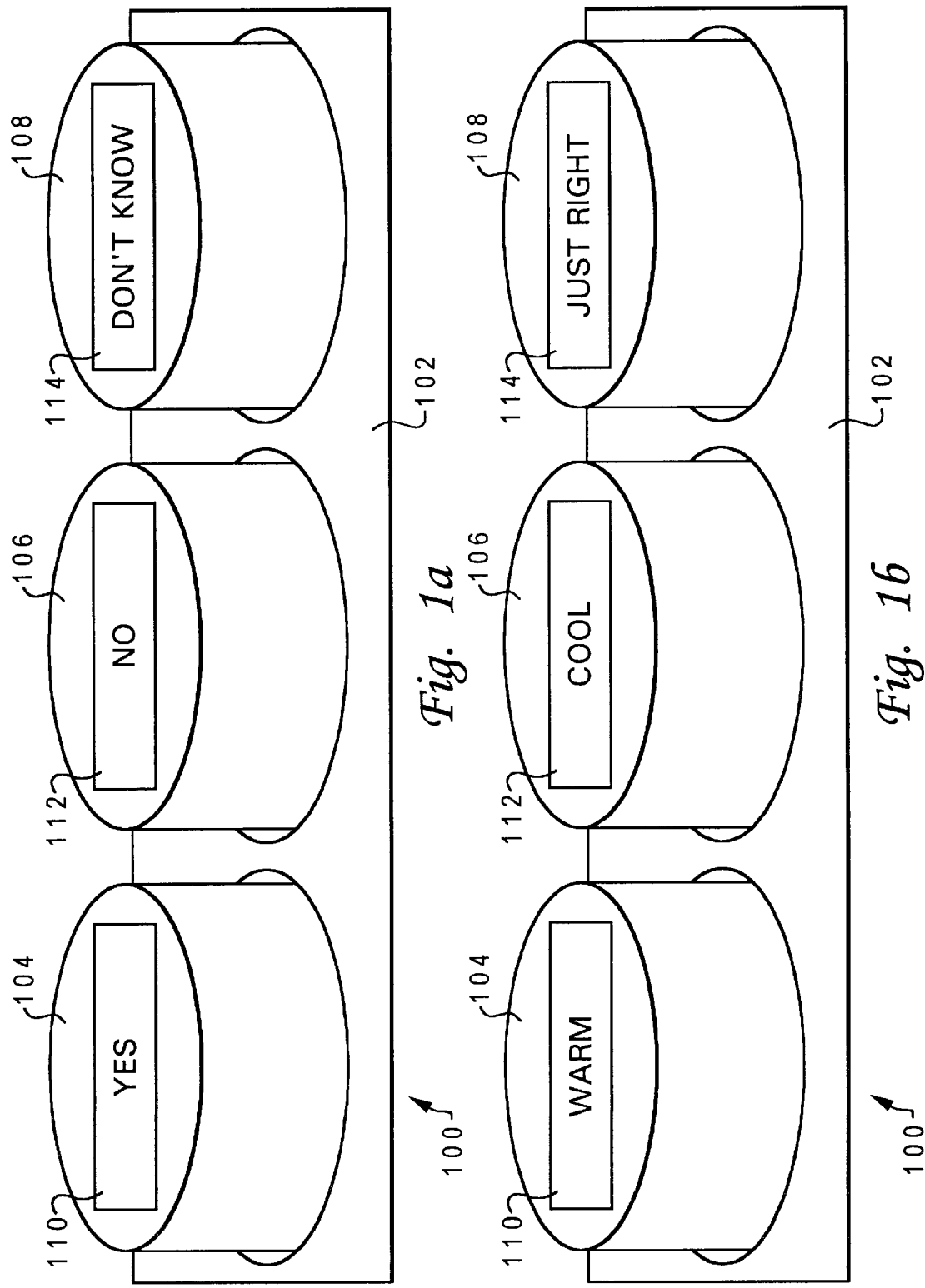

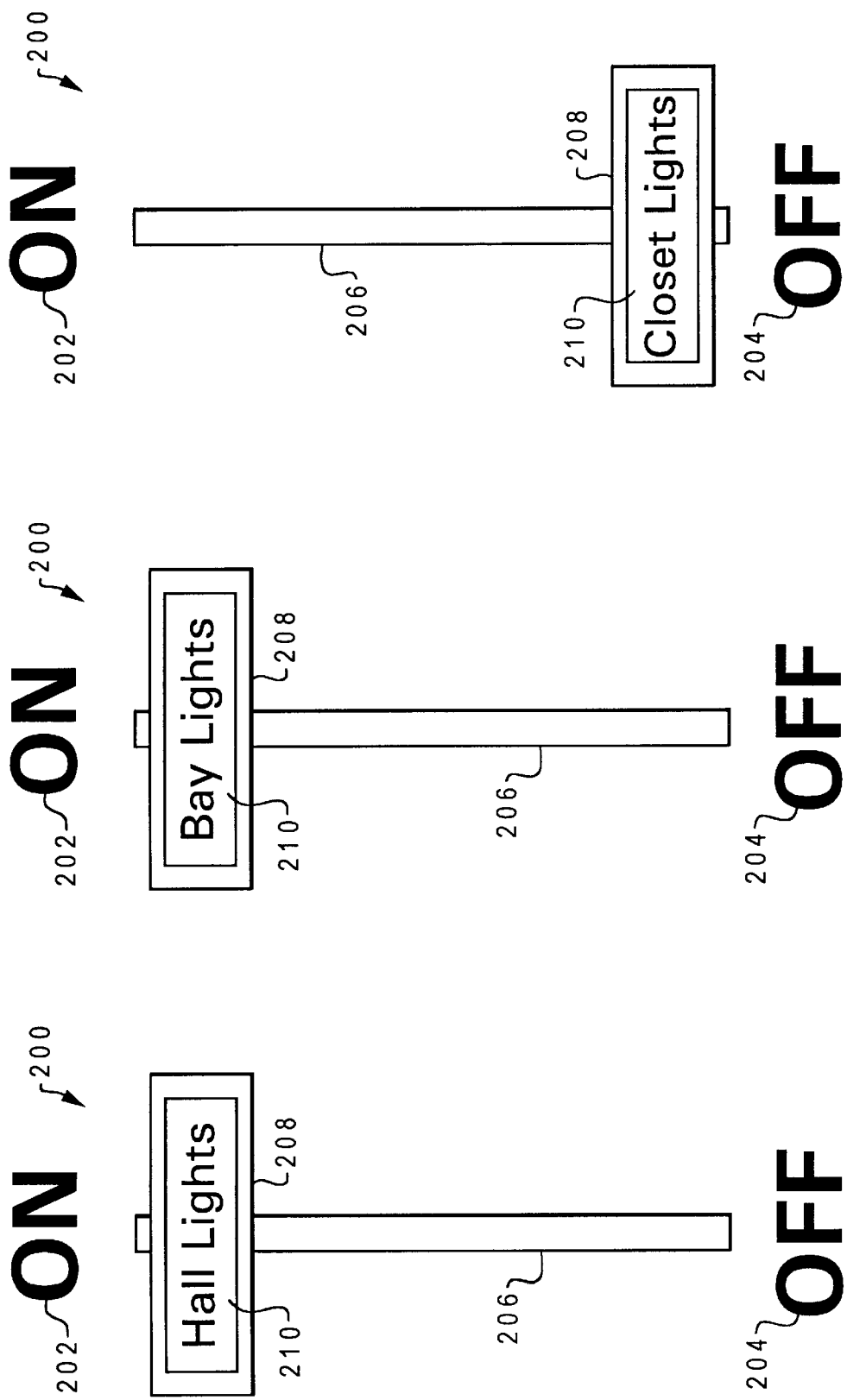

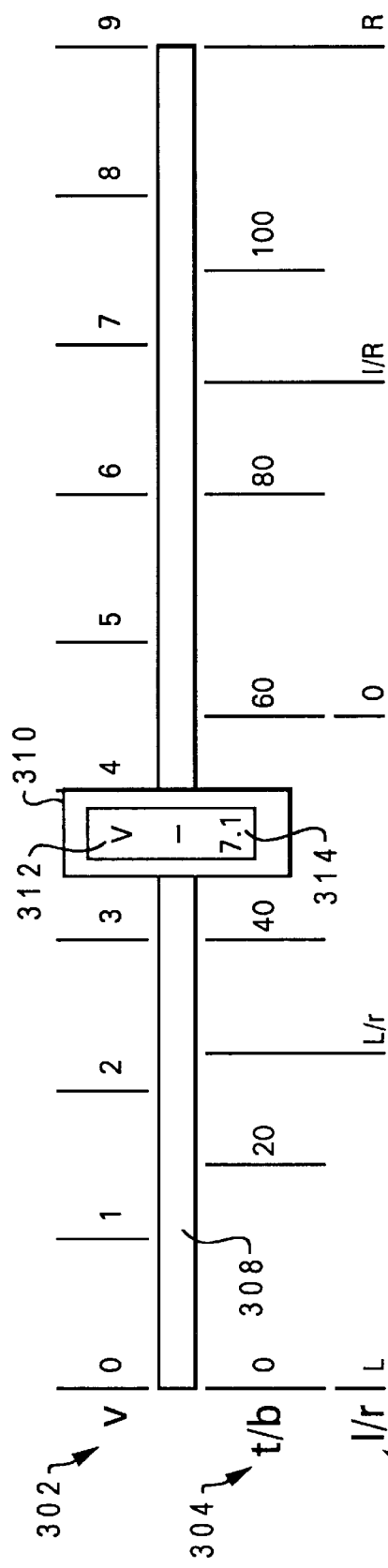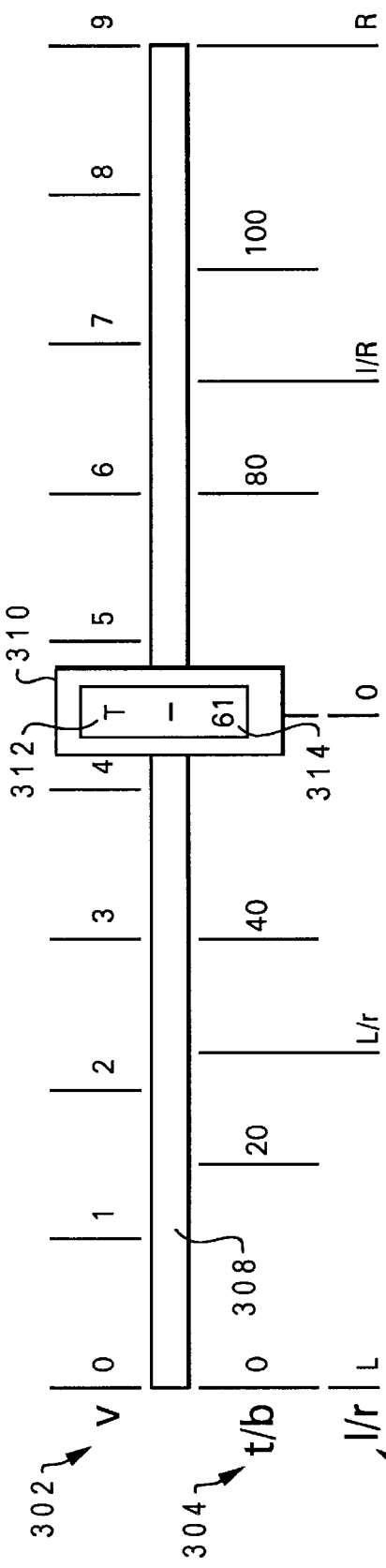

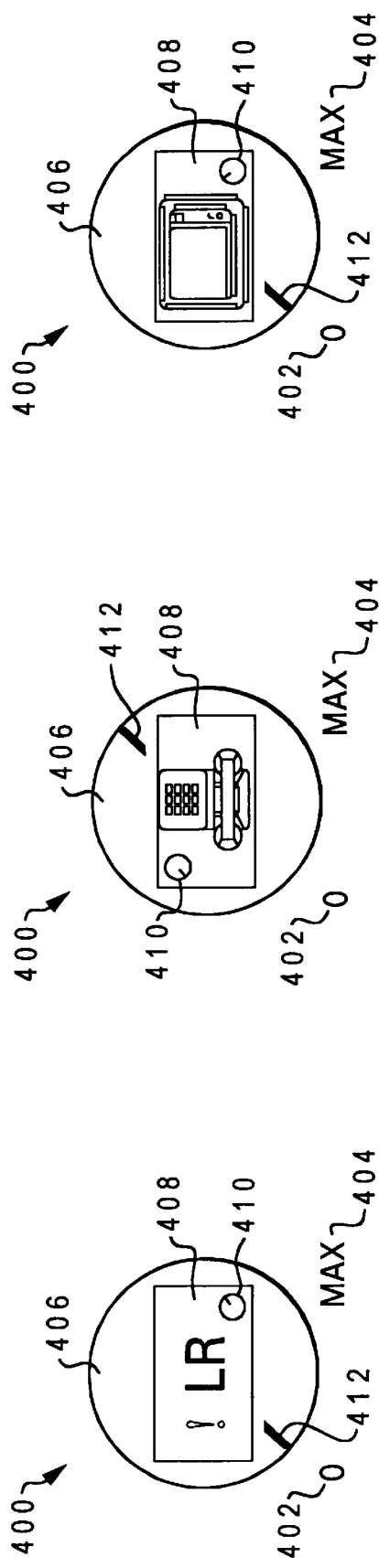
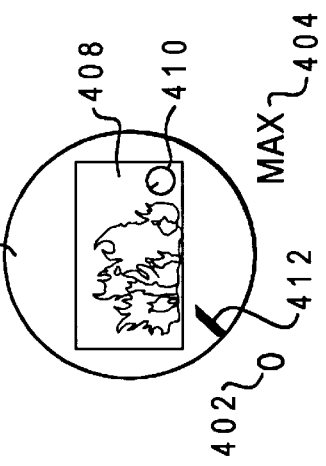
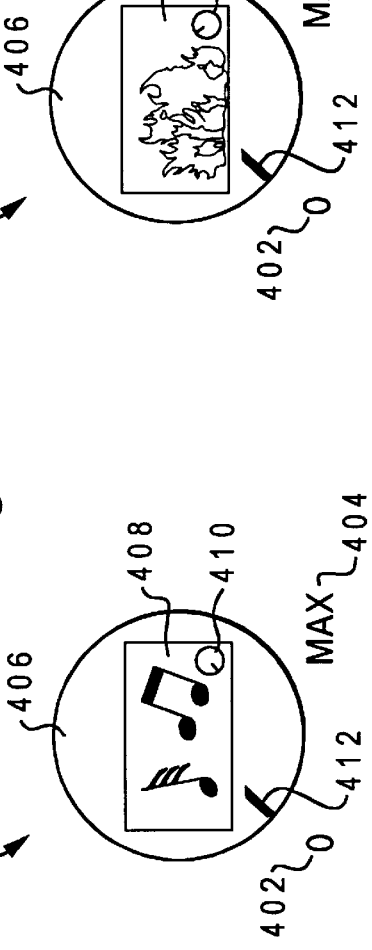

SYSTEM AND METHOD FOR DYNAMIC CONTROLS

The co-pending application Ser. No. 08/763,312, entitled "System and Method for Enhancing Human Communications", and filed on the same day herewith, discloses an invention which utilizes the present invention.

FIELD OF THE INVENTION

The present invention relates generally to mechanical controls, and more particularly to minimizing the mechanical controls on data processing system devices.

BACKGROUND OF THE INVENTION

Data processing systems, such as those associated with computers, Personal Digital Assistants (PDAs), and many other electronic devices, are increasingly becoming embodied on a variety of devices. Semiconductor technology and electronics technology is enabling the production of smaller and faster systems with less moving parts. Many manufacturers strive to find ways to minimize the size of their systems while maximizing functions provided. Mechanical parts such as buttons, switches, sliders, levers, dials, knobs, and the like, also add complexity to manufacturing. Minimizing the number of mechanical controls used to operate a particular device allows minimizing device size and eliminating movable parts which can become damaged. However, minimizing user controls often implies lessening function.

Many data processing systems are equipped with a display which serves as a monitor of processing to facilitate a user interface. A display is dynamic and allows rich visual communications to the user. The display represents the current state of the data processing system at some particular time. Many user controls, for example those of a keyboard, may have been used to reach a particular image on a single display. An electronic device such as a PDA may be difficult to use because so many controls use a common display.

What is required is an improved system and method for providing a rich set of mechanical control function with a minimal set of mechanical controls, while ensuring little complexity of usability.

SUMMARY OF THE INVENTION

The present invention minimizes mechanical controls required on many data processing systems. Conventional controls such as buttons, switches, sliders, levers, dials, knobs, and the like, are improved to offer a user a wide range of control. Discrete controls such as buttons and switches, as well as continuous controls such as sliders and dials, may be defined with many control functions. Thus, controls are made dynamic. A dynamic control (DYCON), hereinafter referred to as a dycon, is a conventional control coupled with a dedicated display means for dynamically defining a variety of associated control functions to the control at different times during processing of a data processing system. A discernible meaning is dynamically provided to the control. Data processing is incorporated to properly coordinate control functions.

It is one objective of the present invention to minimize the number of mechanical controls required on a data processing system device. A minimal set of dycons is enabled for performing many functions. The device can have less moving parts which makes it more easily manufactured, and is less likely to have damage as the result of moving parts. Less controls also allows manufacturing devices of smaller sizes.

It is another objective of the present invention to provide a platform whereon a mechanical control is easily enhanced with additional control by only software changes. Small data processing systems can be upgraded with software revisions that make use of dycons.

Another objective of the present invention is to make use of the abundance of existing mechanical controls available as components and parts for manufacturers. Such controls are readily converted into dycons and can be stocked as prefabricated components for manufacturers. The dycons, as prefabricated components, are stocked in a variety of mechanical forms, along with a variety of supported voltages, wattage, or the like, for dedicated display means. Such prefabricated dycons are united with semiconductor technology to support a convenient interface to the dycon so that manufacturers can incorporate the prefabricated dycon in a host equipment with minimal effort.

Yet another objective of the present invention is to make a device or system user interface more user friendly. Many people are not familiar with computers, data processing systems, or technological interfaces. The present invention will help people use a system and not be intimidated by a system.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein:

FIG. 1*a* is an example of a discrete embodiment of dycons, specifically a button embodiment;

FIG. 1*b* is a continuation of the FIG. 1*a* example;

FIG. 2*a* is another example of a discrete embodiment of a dycon, specifically a switch (or lever);

FIG. 2*b* is a continuation of the FIG. 2*a* example;

FIG. 2*c* is a continuation of the FIG. 2*a* and FIG. 2*b* examples;

FIG. 3*a* is an example of a continuous embodiment of a dycon, specifically a slider (or lever);

FIG. 3*b* is a continuation of the FIG. 3*a* example;

FIG. 4*a* is an example of a continuous embodiment of a dycon, specifically a dial (or knob);

FIG. 4*b* is a continuation of the FIG. 4*a* example;

FIG. 4*c* is a continuation of the FIG. 4*a* and FIG. 4*b* examples;

FIG. 4*d* is a continuation of the FIG. 4*a*, FIG. 4*b*, and FIG. 4*c* examples;

FIG. 4*e* is a continuation of the FIG. 4*a*, FIG. 4*b*, FIG. 4*c*, and FIG. 4*d* examples;

FIG. 5 depicts a block diagram of a minimal data processing system useful for implementing data processing aspects of the present invention;

FIG. 6*a* depicts a flowchart for the preferred operation of a dyconic system;

FIG. 6*b* depicts a flowchart for describing a discrete embodiment of a dycon according to the FIG. 6*a* flowchart;

FIG. 6*c* depicts a flowchart for describing a continuous embodiment of a dycon according to the FIG. 6*a* flowchart; and FIG. 7 illustrates a prefabricated component embodiment of the present invention.

DETAILED DESCRIPTION OF THE PREFERRED EMBODIMENTS

Overview of the Invention

Figure 5:
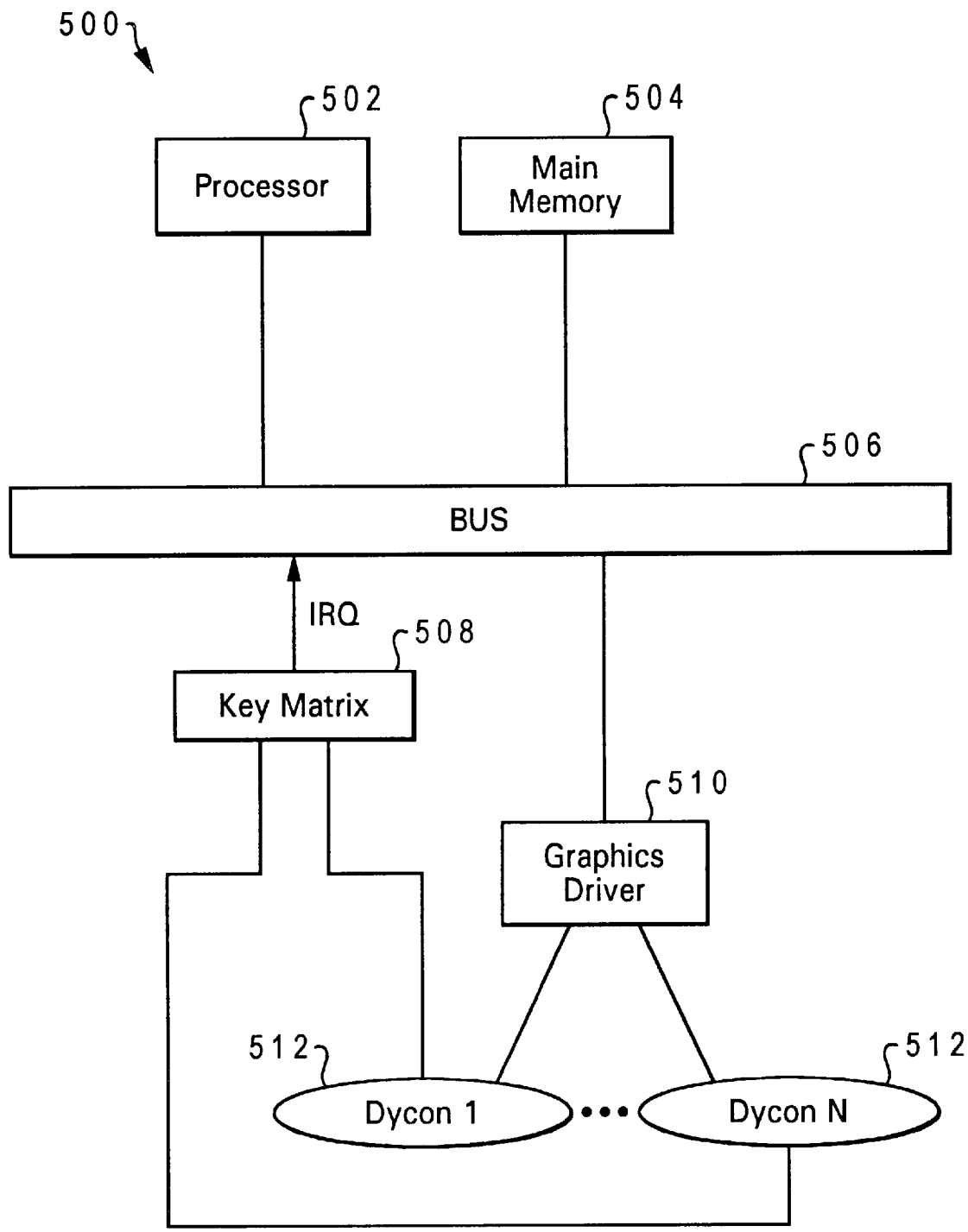

A dycon is a conventional control coupled with a dedicated display means, coordinated by data processing. It is well known to those skilled in the relevant art how the mechanisms of such conventional controls are designed, how they operate, and how they are manufactured. Varieties of display means are available for converting a conventional control into a dycon. Preferably, the dedicated display means is affixed to the control. Alternate embodiments will locate the dedicated display means in a location which is visually perceptible as being dedicated to a particular control. A dycon has one, and only one, dedicated display means which depicts information for only that particular dycon. A dycon's dedicated display means has one, and only one, mechanical control for which it displays meaning. Information displayed on the dedicated display means assigns a current meaning to the dycon. A dycon may have many meanings over a period of time as indicated by the many variations in what is displayed for the dycon.

Candidate embodiments of small display means include Liquid Crystal Displays (LCDs), Light Emitting Diode (LED) displays, Electroluminescent (EL) displays, customized Color Plasma Displays (CPDs), customized Flat Panel Displays (FPDs), and the like. Display means which are vulnerable to damage, such as LCDs which are affixed to, or integrated with, a control, should be protected with an appropriate rigid transparent covering. The rows by columns matrix for a particular display should be suitable for the size and types of images to be displayed. Those skilled in the art recognize the many options available which are suitable for display means, considering characteristics such as refresh speed, low voltage requirements, graphical resolution, etc. Many techniques exist across manufacturers for image enhancements. The display means may display text, graphics, icons, animation, or anything which can be displayed.

Small EL displays can be glued directly onto a control. An EL display is a thin film luminescent layer sandwiched between layers (at least one transparent viewing side layer) and a matrix of row and column electrodes. The electronic control circuit lights pixels by energizing the phosphor of intersecting row and columns.

Discrete Embodiment of the Invention

FIG. 1a is an example of a discrete embodiment of dycons, specifically a button embodiment. A button is pressed or not pressed, thereby being discrete in nature. A button control panel 100 of three mechanical buttons is supported by a button housing 102 (only top surface shown). Button 104, button 106, and button 108 contains a display 110, display 112, and display 114, respectively. Comparing FIG. 1a with FIG. 1b shows that the same buttons are capable of different meanings, depending on the state of the underlying data processing system and what is displayed. Buttons 104, 106, and 108 are capable of having many meanings to many contexts of a data processing system.

Discrete Embodiment (Including a Plurality of Settings) of the Invention

FIG. 2a is another example of a discrete embodiment of a dycon, specifically a switch (or lever). A mechanical switch or mechanical lever can be discrete in nature provided it has a plurality of discrete settings. A switch 200 contains ON and OFF labels, 202 and 204, respectively. A female slot 206 enables manipulation of a mating switch handle 208 which contains a display 210. Comparing FIG. 2a, FIG. 2b, and FIG. 2c shows that the same switch handle 208 is capable of different meanings, depending on the state of the underlying data processing system and what is displayed. The switch 200 is capable of having many meanings to many contexts of a data processing system.

The discrete embodiment including a plurality of settings can have a feature not required of the button example. Dynamic changes to display 210 implies the mechanical switch setting of ON or OFF may be out of synch with the real value of the current meaning (as indicated by display 210). In the FIG. 2a example, there may be a 50/50 chance that a new meaning displayed will be positioned at the correct setting, if all meanings are valid candidates for display at any time. The data processing system which coordinates a discrete embodiment including a plurality of settings can enforce that only the meanings valid for that setting are displayed at any time.

For example, accessing for the first time a centralized data processing system for managing all electricity to a large auditorium may cause initialization of all meanings of switch 200 to OFF, after assuring all associated electrical fixtures are OFF. Consider a simple example wherein a user uses a conventional button to the underlying data processing system to toggle all displayed meanings for switch 200 which operates all electrical fixtures to a large auditorium. A special NO-OP (no operation) meaning can be used so that the switch can be moved to settings without causing ON and OFF processing. A NO-OP may be displayed with a blank display 210. The data processing system ignores any Interrupt Request (IRQ) when the meaning is NO-OP. When the switch is placed into the OFF position, toggling meanings will only display the next meaning which currently has an OFF value. Thus, upon first use according to the simple example, all meanings can be displayed when the switch 200 is in the OFF position because all fixtures and associated values are OFF. NO-OP can be toggled to at any setting. An alternate embodiment allows placing the dycon into NO-OP mode at any time. Likewise, if then the NO-OP meaning is used to place the switch into the ON position, toggling meanings while in the ON position will only display the next meaning which currently has an ON value. Thus, upon first use according to the simple example, toggling while in the ON position will yield only the NO-OP setting because all fixtures and associated values are currently OFF. Moving the switch to another setting while any meaning other than NO-OP is displayed causes an IRQ to the data processing system to be processed for the new setting (for example turns the fixture ON or OFF). Note that a single switch can replace many switches.

If a switch (or lever) happens to have N settings (more than an ON and OFF setting), the same rules apply. The switch (or lever) is moved without affecting any processing during a NO-OP meaning. Moving the switch (or lever) during anything other than a NO-OP meaning results in a change of the value for the currently assigned meaning.

Continuous Embodiments of the Invention

FIG. 3a is an example of a continuous embodiment of a dycon, specifically a slider (or lever). A mechanical slider or mechanical lever can be continuous in nature provided it has a continuous range of settings. Any position within the entire range is a valid position. Of course, a slider (or lever) can also be discrete in nature as described above.

For example, a continuous slider 300 for governing control of an audio output, contains a volume range 302 with value from 0 through 9, a treble or bass range 304 with value from 0 through 100, and a left/right speaker balancing range 306. A female slot 308 enables manipulation of a mating slider handle 310 which contains a display 312. In one embodiment, a continuous dycon optimally contains a continuously dynamic refresh value 314 which is displayed along with a current meaning to indicate the actual current setting. The position of the slider may not at all be indicative of the current setting for a currently displayed meaning. Therefore, refresh value 314 facilitates communicating additional meaning information to a user. Comparing FIG. 3a and FIG. 3b shows that the same slider handle 310 is capable of different meanings, depending on the state of the underlying data processing system and what is displayed. The slider 300 is capable of having many meanings to many contexts of a data processing system. The continuous embodiment may utilize a feature not heretofore discussed. For example, assume again the simple case of a conventional button used to toggle meanings displayed on slider handle 310. In the FIG. 3a example, four meanings of volume, treble, bass, and left/right, can be assigned. When the particular meaning is displayed on display 312, the associated scale is used to determine which setting is desired for the meaning and the slider handle 310 can be moved appropriately. A refresh value 314 dynamically changes to reflect the current value for a particular meaning when moving the slider handle 310. The value of a particular meaning is determined by the last position of the slider handle 310 when its been moved subsequent to taking on a particular meaning. Therefore, toggling through a plurality of new meanings without ever moving the slider handle 310 does not affect the value for meanings toggled. Refresh value 314 always displays the actual value for the displayed meaning. The slider handle 310 is moved while displaying a meaning in order for that meaning to take on a new value. Note that refresh value 314 in FIG. 3a (7.1) is associated with the current meaning of "set the volume", although the slider handle 310 is not positioned accordingly. FIG. 3a is indicative that the "set volume" meaning was toggled to without subsequent slider handle 310 movement. Note that refresh value 314 in FIG. 3b (61) is associated with the current meaning of "set treble", while the slider handle 310 is positioned accordingly. FIG. 3b is indicative that the "set treble" meaning was likely toggled to with subsequent slider handle 310 movement. The refresh value 314 is real-time updated as the slider handle 310 is moved.

An alternate embodiment of refresh value 314 comprises a percentage of slider handle 310 into the female slot 308. Another alternate embodiment of refresh value 314 comprises a progress bar replicating slider position for a particular meaning.

FIG. 4a is another example of a continuous embodiment of a dycon, specifically a dial (or knob). A mechanical dial or mechanical knob can be continuous in nature provided it has a continuous range of settings. Any position within the entire range is a valid position. Of course, a dial (or knob) can also be discrete in nature as described above.

For example, a continuous dial 400 for governing control of smart house functions contains a zero setting label 402, a maximum setting label 404, a cylindrical member 406 which can be turned clockwise or counter-clockwise, a display 408, a refresh value 410, and a setting mark 412. The position of the dial 400 may not at all be indicative of the current setting for a currently displayed meaning. Therefore, refresh value 410 facilitates communicating a meaning's current value to a user. Comparing FIG. 4a, FIG. 4b, FIG. 4c, FIG. 4d, and FIG. 4e shows that the same dial 400 is capable of different meanings, depending on the state of the underlying data processing system and what is displayed. The dial 400 is capable of having many meanings to many contexts of a data processing system.

Again assuming the simple case of a conventional button used to toggle meanings displayed on dial 400, a smart house control system is shown. In,the example, five meanings are demonstrated for assignment. A graphical refresh value 410 dynamically changes to reflect the current value for a particular meaning when moving the cylindrical member 406. The value of a particular meaning is determined by the last position of the setting mark 412 on cylindrical member 406 when its been moved subsequent to taking on a particular meaning. Therefore, toggling through a plurality of new meanings without ever manipulating the dial 400 does not affect the value for meanings toggled. Refresh value 410 always displays the actual value for the displayed meaning. The setting mark 412 on cylindrical member 406 is moved while displaying a meaning in order for that meaning to take on a new value. FIGS. 4a, 4c, and 4e are indicative of a new meaning being displayed without subsequent manipulation of the dial because the setting for the current meaning is different than the mechanical setting of the dial.

FIGS. 4b and 4d are indicative that the meaning was likely toggled to with subsequent dial movement. In FIG. 4b, the graphic appears upside down. The refresh value 410 actually shows an identical mechanical position. An alternate embodiment will dynamically affect the image within display 408 so that it does not rotate with dial manipulation. Another embodiment will use a square or circular display means. In FIG. 4d, refresh value 410 also shows an identical mechanical position.

The meaning in FIG. 4a allows setting intensity of the living room lights. The meaning in FIG. 4b allows setting volume of a particular telephone. The meaning in FIG. 4c allows setting the volume of the television. The meaning in FIG. 4d allows setting the volume of the stereo set. The meaning in FIG. 4e allows setting the intensity of the gas fireplace. The instant the dial is moved, refresh value 410 is dynamically updated to reflect a new position. The graphic is real-time updated as the dial is turned. Note that all displaying is graphical in nature. A NO-OP meaning may also be provided for dial operation without affecting settings.

Of course, many shapes, sizes, and types of mechanical controls and dedicated display means, as well as various types of refresh value embodiments and dynamic display refreshes, may be employed without departing from the spirit and scope of the invention.

A dycon can be manufactured as a hardware unit to be sold as a single component to a manufacturer, referred to as a prefabricated component. The prefabricated component comprises a housing for coupling a control with a dedicated display means. Distinct interfaces can be kept intact as known to those skilled in the relevant art.

In an alternate embodiment, a single display apparatus may be utilized provided a specific area of the display is dedicated to a specific control. For example, a square display apparatus may have 4 controls at each corner. The controls would be dycons provided their quadrant of the display apparatus was dedicated, and never used for any other purpose except to display meaning for the single particular control. A dycon has a dedicated display means that only displays information for that dycon. In this example, the quadrant of a shared display is visually perceptible as being dedicated to the particular control, particularly since only that particular dycon information is displayed at any time in the quadrant. In fact, such an embodiment is called a polydycon. A polydycon is a plurality of dycons which are manufactured as a single hardware unit to be sold as a single component to a manufacturer (prefabricated component).

In yet another dyconipolydycon embodiment, a prefabricated component includes a semiconductor element to provide built-in data processing with a convenient electrical interface to the component. A single data processing interface to the semiconductor element of the dycon provides a manufacturer with facilitated "plug and play" function, and less data processing functionality is required in the data processing system which hosts the prefabricated component.

Data Processing Aspects of the Invention

FIG. 5 depicts a block diagram of a minimal data processing system useful for implementing data processing aspects of the present invention. A data processing system 500 according to the present invention includes at least one processor 502 coupled to a bus 506. The data processing system 500 also includes main memory 504, for example, random access memory (RAM). Optionally, the data processing system 500 may include secondary storage devices such as a hard disk drive, compact disk, or the like (not shown), also connected to bus 506.

The data processing system 500 also includes a key matrix module 508 for issuing Interrupt Requests (IRQs) upon detection of user manipulation of control(s). A graphics driver 510 drives dedicated display means for dycons 512 according to data processing system control logic.

Data processing system programs (also called control logic) may be completely inherent in the processor 502 being a customized semiconductor, or may be stored in main memory 504 for execution by processor 502 as the result of a read-only memory (ROM) load (not shown), or may be loaded from a secondary storage device (not shown) into main memory 504 for execution by processor 502. Such programs, when executed, enable the data processing system 500 to perform features of the present invention as discussed herein. Accordingly, such data processing system programs represent controllers of the data processing system.

In one embodiment, the invention is directed to a control logic program product comprising a processor 502 readable medium having control logic (software) stored therein. The control logic, when executed by processor 502, causes the processor 502 to perform functions of the invention as described herein.

In another embodiment, the invention is implemented primarily in hardware, for example, using a prefabricated component state machine (or multiple state machines) in a semiconductor element such as processor 502. Key matrix module 508, as well as graphic driver 510, may have all, or part of, its processing in the semiconductor element. This embodiment allows a prefabricated component which is stocked for, and sold to, manufacturers. A data processing system interface, such as a standard one, may be supported by the prefabricated component through use of the semiconductor. This allows manufacturers to anticipate how a dycon will be used and then adapting one to the data processing system device during their production phase with minimal effort.

Those skilled in the art will appreciate various modifications to the data processing system 500 without departing from the spirit and scope of the invention.

Figure 6A:
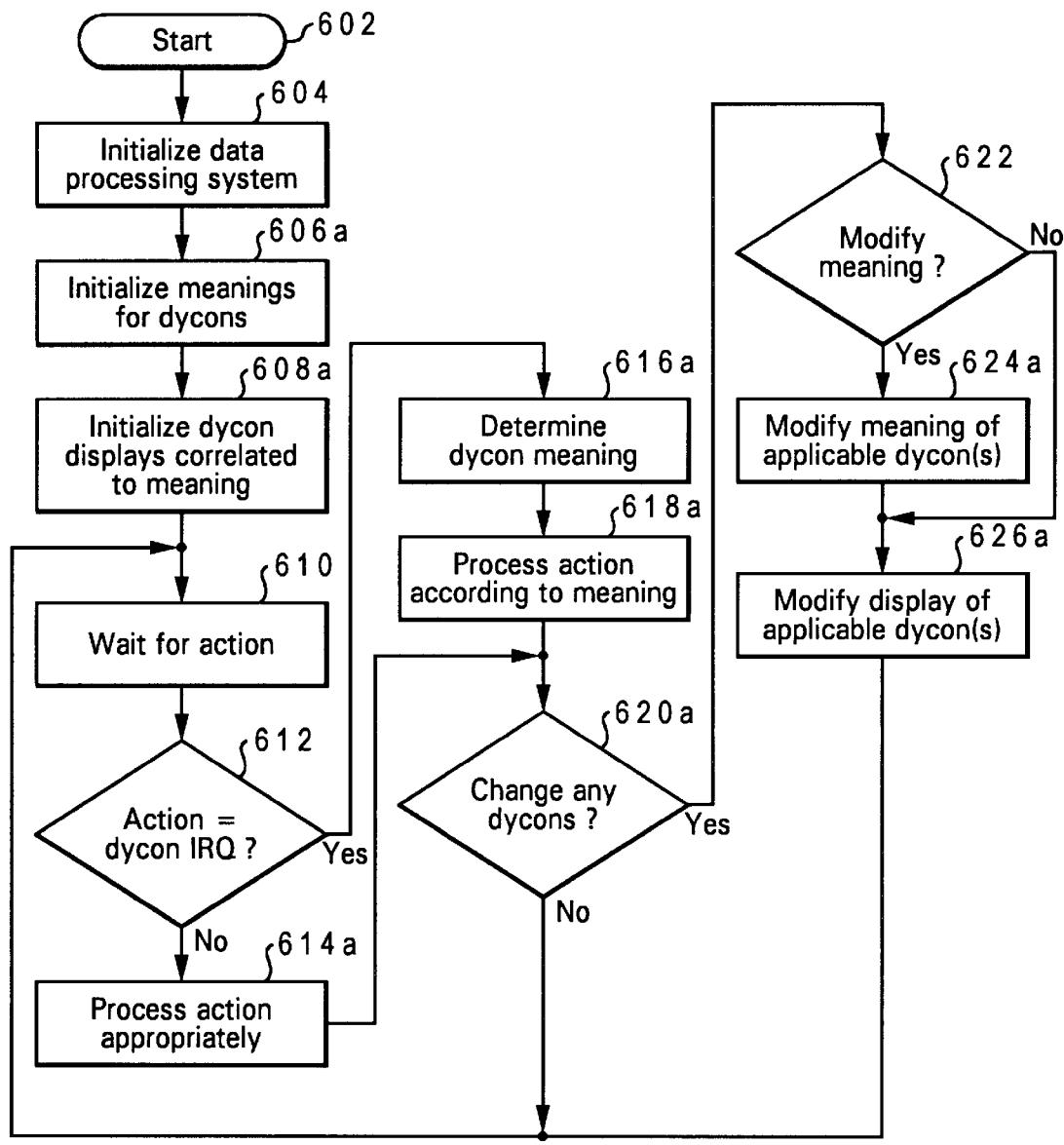

FIG. 6a depicts a flowchart for the preferred operation of a dyconic system. Processing begins at step 602 and continues to step 604. Step 604 initializes the data processing system. Thereafter, step 606a initializes meanings for all dycons, for example in a main memory 504 table, indexed by a particular dycon reference received from the key matrix module 508. Then, step 608a initializes dycon dedicated displays according to their initialized meanings. Thereafter, the data processing system waits at step 610 for an action, for example, IROs as the result of user action. An asynchronous action such as an elapsed timer may also determine the action of step 610. Step 610 forms the top of a main processing loop for all action processing. An action, for example, an IRQ from the key matrix module 508, causes step 610 to flow to step 612.

If at step 612, it is determined that the action is not an IRQ for a manipulated dycon (e.g. a conventional control), then processing continues to step 614a where appropriate processing occurs, and then to step 620a which will be described below. If at step 612, it is determined that the action is an IRQ for a manipulated dycon, then processing continues to step 616a where the current meaning of the manipulated dycon is determined, and then to step 618a where appropriate processing occurs according to the current meaning of the manipulated dycon. Thereafter, step 620a is processed.

If step 620a determines that no dycon is to be modified, then step 620a returns to step 610 as described above. If at step 620a, one or more dycons is to be modified, processing continues to step 622. If at step 622, one or more dycons are to have their meanings modified, step 624a will update the current meaning(s) for processing (as internally maintained by the data processing system), and step 626a will modify the dycon dedicated display(s) accordingly. Processing then continues back to step 610 as previously described.

If at step 622, no dycons are to have meanings modified, then control passes to step 626a where the dycon dedicated display(s) are updated appropriately, and processing continues back to step 610 as previously described. Note that a termination IRQ may be determined at step 612 wherein step 614a terminates processing.

In a textual example of step 626a, if the text to be displayed is less than a single displayable line length of the dycon, a single text line in a large sized font can be displayed. If the text to be displayed is greater than the single displayable line length of the dycon, multiple lines of a smaller sized font can be used to display information to the dycon. Dycon embodiments will support a variety of image specifications, for example text lines, fonts, sizes, and other attributes, which can be dynamically used for information to be displayed in the optimal manner. Step 626a makes decisions how to display based on what information is to be displayed and what display means is used to display.

Figure 6B:
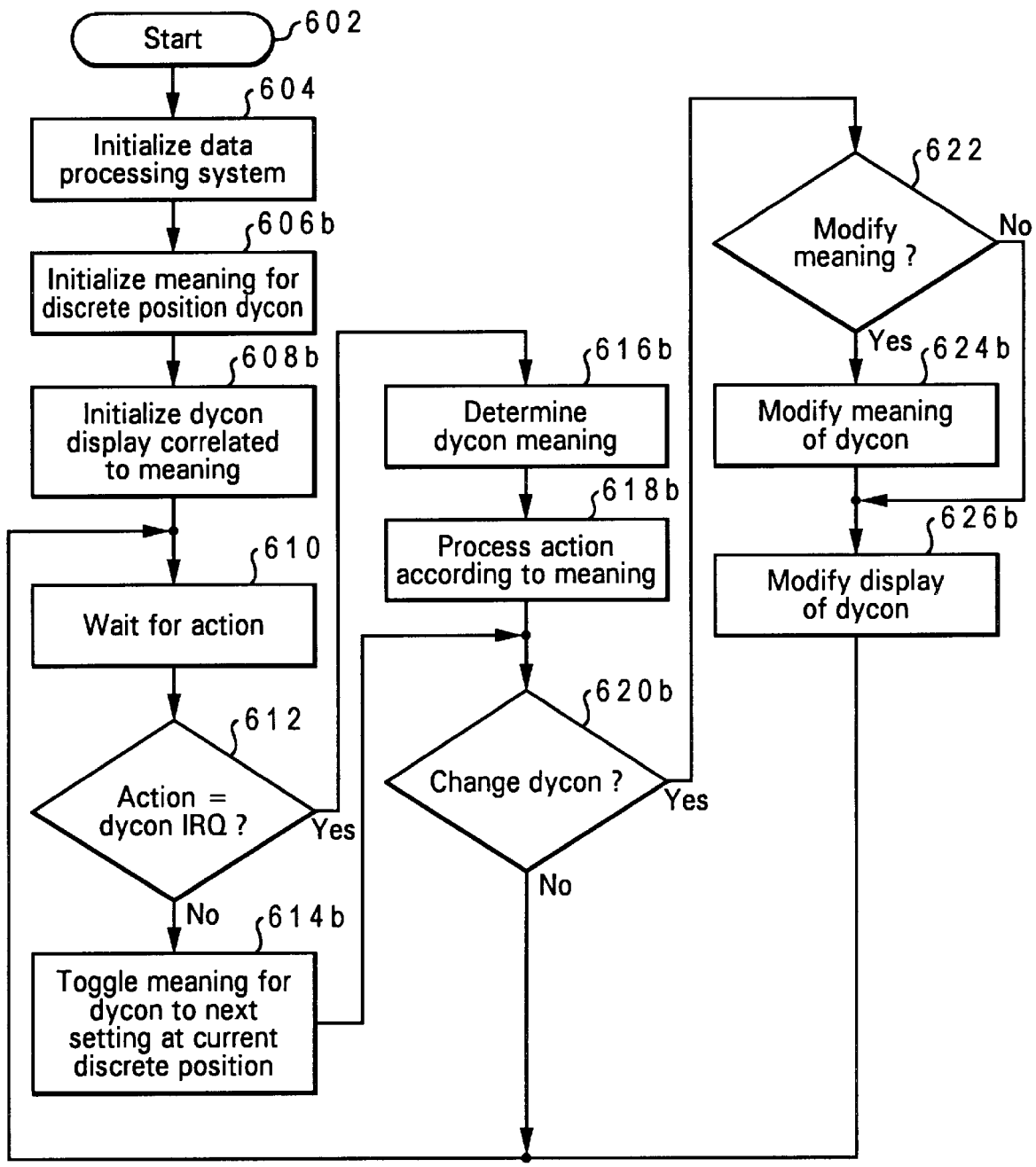

FIG. 6b depicts a flowchart for describing a discrete embodiment of a dycon according to the FIG. 6a flowchart. Processing begins at step 602 and continues to step 604. Step 604 initializes the data processing system. Thereafter, step 606b initializes the meaning of the discrete dycon. Then, step 608b initializes the dycon's dedicated display means according to the initialized meaning. Thereafter, the data processing system waits at step 610 for an action, for example, IRQs as the result of user action. Step 610 forms the top of a main processing loop for all action processing. An action, for example, an IRQ from the key matrix module 508, causes step 610 to flow to step 612.

If at step 612, it is determined that the action is not an IRQ for the manipulated dycon, then processing continues to step 614b where appropriate processing occurs, and then to step 620b which is described below. To continue with the simple toggle button example used in discrete embodiment descriptions above, step 614b would execute as the result of a toggle button activation, wherein the meaning of the discrete dycon could be toggled appropriately (in which case thereafter steps 620b, 622, 624b, and 626b would be processed as described below). If at step 612, it is determined that the action is an IRQ for the dycon, then processing continues to step 616b where the current meaning of the dycon is determined, and then to step 618b where appropriate processing occurs according to the current meaning of the dycon. Thereafter, step 620b is processed.

If step 620b determines that the dycon is not to be modified, then step 620b returns to step 610 as described above. If at step 620b, the dycon is to be modified, processing continues to step 622.

If at step 622, the dycon is to have its meaning modified, step 624b will update the current meaning for processing (as maintained internally by the data processing system), and step 626b will modify the dycon's dedicated display accordingly. Processing then continues back to step 610 as previously described. Processing of discrete dycon embodiments similar to the simple example above always exits step 622 by way of step 624b. Note that a termination IRQ may be determined at step 612 wherein step 614b terminates processing. A NO-OP meaning is ignored by step 614b wherein step 620b returns to step 610. A NO-OP can also be ignored by the key matrix module 508.

Figure 6C:
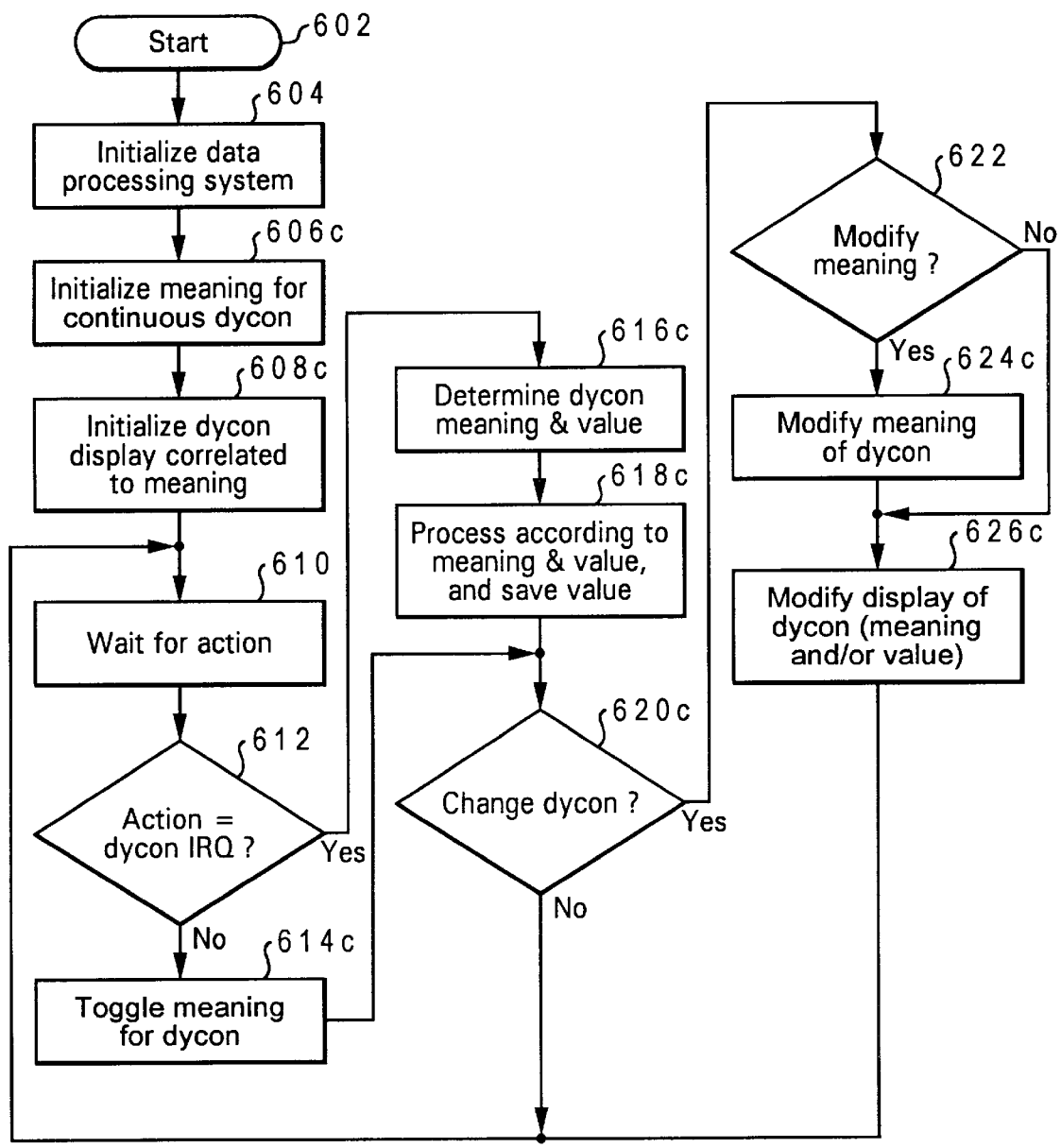

FIG. 6c depicts a flowchart for describing a continuous embodiment of a dycon according to the FIG. 6a flowchart. Processing begins at step 602 and continues to step 604. Step 604 initializes the data processing system. Thereafter, step 606c initializes the meaning of the continuous dycon. Then, step 608c initializes the dycon's dedicated display according to the initialized meaning. Thereafter, the data processing system waits at step 610 for an action, for example, IRQs as the result of user action. Step 610 forms the top of a main processing loop for all action processing. An action, for example, an IRQ from the key matrix module 508, causes step 610 to flow to step 612.

If at step 612, it is determined that the action is not an IRQ for the manipulated dycon, then processing continues to step 614c where appropriate processing occurs, and then to step 620c which is described below. To continue with the simple toggle button example used in continuous embodiment descriptions above, step 614a would execute as the result of a toggle button activation, wherein the meaning of the continuous dycon could be toggled appropriately (in which case thereafter steps 620c and 622 would be processed as described below).

If at step 612, it is determined that the action is an IRQ for the dycon, then processing continues to step 616c where the current meaning (and value) of the dycon is determined, and then to step 618c where appropriate processing occurs according to the current meaning (and value) of the dycon. Since the dycon was manipulated as determined by step 612, step 618c saves the value along with dycon information. Thereafter, if step 620c determines that the dycon is not to be modified, then step 620c returns to step 610 as described above. If at step 620c, the dycon is to be modified, processing continues to step 622. Arriving to step 620c by way of step 618c will always cause control to flow to step 622 because the refresh value is updated.

If at step 622, the dycon is to have its meaning modified, step 624c will update the current meaning for processing (as maintained internally by the data processing system), and step 626c will modify the dycon's dedicated display accordingly. Processing then continues back to step 610 as previously described. If at step 622, the dycon is not to have its meaning modified, then step 626c will modify the dycon's dedicated display means as necessary (e.g. refresh value), and processing continues to step 610. Processing of continuous dycon embodiments as described in the simple example above will modify the dedicated display for changed meaning, dynamic refresh value, or both. Note that a termination IRQ may be determined at step 612 wherein step 614c terminates processing.

Many embodiments will rely completely on the data processing system for coordinating that which is viewed on a dycon's dedicated display means. A conventional control, an other dycon, or the same dycon itself, can also be used to affect that which is viewed on the dycon's dedicated display means. In fact, one dycon can be used to operate an entire system. For example, a button embodiment dycon can use the data processing system to manage multiple dycon presses within a time period, duration of a dycon press, or timings of interface with respect to dycon manipulation, and the like, to change meanings for that same dycon.

Also, the meaning (and refresh value) of a dycon may be a plurality of information displayed for that dycon.

Prefabricated Component Embodiment of Invention

Figure 7:
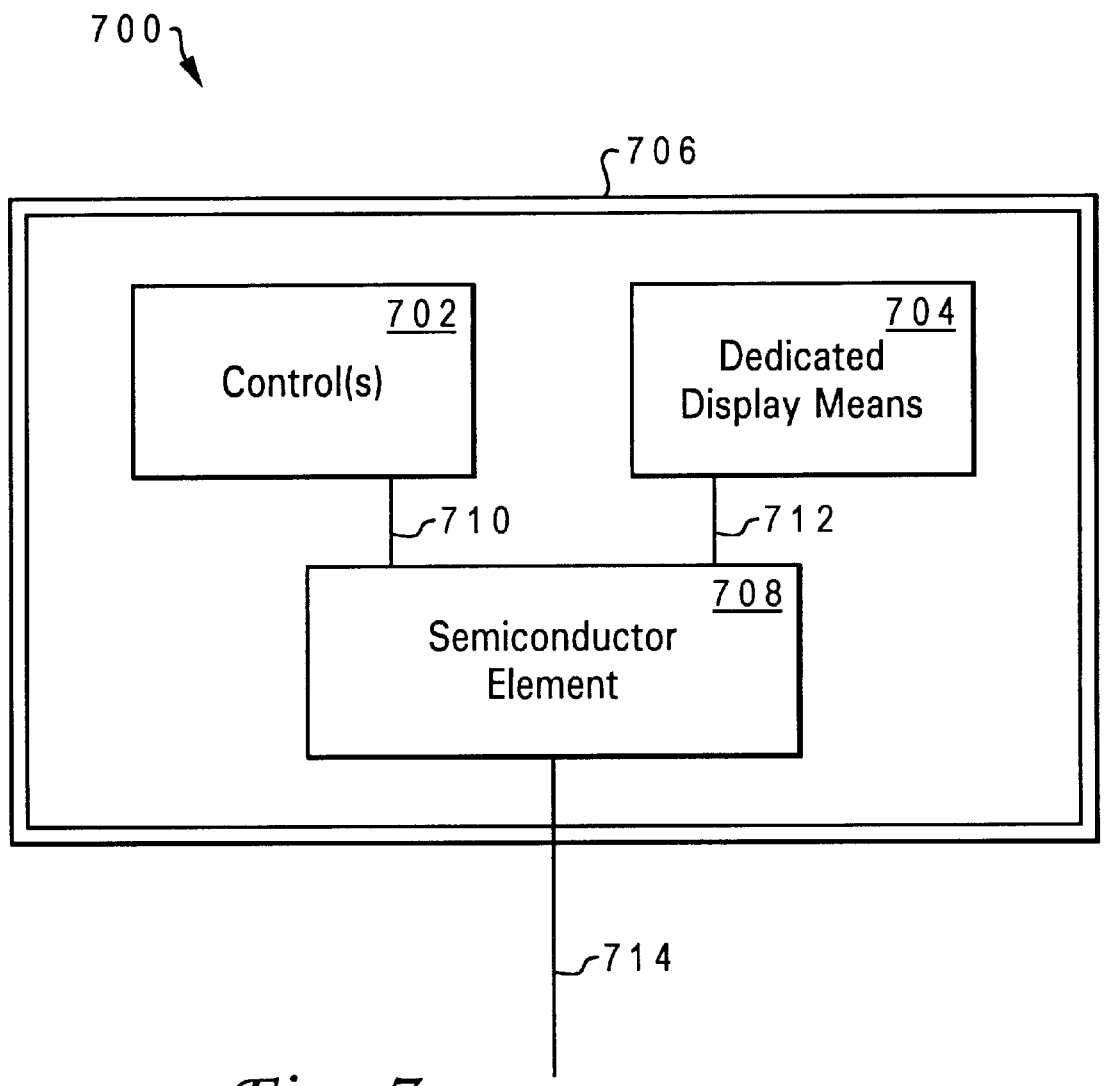

FIG. 7 illustrates a prefabricated component embodiment of the present invention. A prefabricated component 700 comprises control(s) 702 coupled with dedicated display means 704 (for each control if plural controls) by a housing 706. Control(s) 702, dedicated display means 704 are further coupled with a semiconductor element 708 by the housing 706. Control(s) 702 has a control interface 710 to the semiconductor element 708. The dedicated display means 704 has a graphics interface 712 to the semiconductor element 708. The semiconductor element 708 has a data processing interface 714 for interfacing with a receiving system of prefabricated component 700.

An alternative embodiment of prefabricated component 700 comprises a prefabricated component with control(s) 702 coupled with dedicated display means 704 (for each control if plural controls) by a housing 706. Control(s) 702 has a control interface 710 to a receiving system of the prefabricated component. The dedicated display means 704 has a graphics interface 712 to the receiving system of the prefabricated component.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A dycon, comprising:
   a mechanical control constructed of hardware, said mechanical control manipulated manually and capable of communicating a plurality of values;
   a dedicated display means coupled with said mechanical control;
   means for dynamically displaying a plurality of purposes for said mechanical control to said dedicated display means; and
   means for processing any one of said plurality of values in context to any one of said plurality of purposes upon recognition of user manipulation of said mechanical control, said context corresponding to one of said plurality of purposes displayed to said dedicated display means at the time of said user manipulation.

2. The dycon of claim 1 wherein said mechanical control comprises a discrete control.

3. The dycon of claim 1 wherein said mechanical control comprises a continuous control.

4. The dycon of claim 1 wherein said means for processing any one of said plurality of values in context to any one of said plurality of purposes upon recognition of user manipulation of said mechanical control further includes means for ignoring said plurality of values when said means for dynamically displaying a plurality of purposes for said mechanical control displays a NO-OP purpose to said dedicated display means.

5. The dycon of claim 1, wherein said means for dynamically displaying a plurality of purposes for said mechanical control comprises means for rendering a visual image to said dedicated display means.

6. The dycon of claim 1, wherein said means for dynamically displaying a plurality of purposes for said mechanical control further comprises means for communicating a dynamic refresh value in context to one of said plurality of purposes currently displayed to said dedicated display means.

7. The dycon of claim 6, wherein said dynamic refresh value comprises a graphical image.

8. The dycon of claim 1, wherein said means for dynamically displaying a plurality of purposes for said mechanical control further comprises displaying one of said plurality of purposes as a result of processing by said means for processing any one of said plurality of values in context.

9. A prefabricated dycon component which is provided to manufacturers of a controllable system device, said component comprising:
   a housing;
   at least one mechanical control constructed of hardware and coupled to said housing, said mechanical control manipulated manually and capable of communicating a plurality of values;
   a dedicated display means coupled to said housing;
   graphics interface means coupled to said housing for dynamically displaying a plurality of purposes for said mechanical control to said dedicated display means; and
   control interface means coupled to said housing for communicating any one of said plurality of values to said controllable system device in context to any one of said plurality of purposes upon recognition of user manipulation of said at least one mechanical control, said context corresponding to one of said plurality of purposes displayed to said dedicated display means at the time of said user manipulation, and said controllable system device a receiving system of said prefabricated dycon component.

10. The prefabricated dycon component of claim 9 further comprising a semiconductor element containing control logic means for said graphics interface means coupled to said housing.

11. The prefabricated dycon component of claim 9 further including a semiconductor element containing control logic means for said control interface means coupled to said housing.

12. The prefabricated dycon component of claim 11 wherein said control logic means further includes a data processing system interface to said controllable system device.

13. A method of managing a dycon, comprising the steps of:
   accepting a plurality of values from a mechanical control constructed of hardware, said mechanical control manipulated manually; and
   dynamically displaying a plurality of purposes for said mechanical control to a dedicated display means coupled with said mechanical control; and
   processing any one of said plurality of values in context to any one of said plurality of purposes for said mechanical control upon recognition of user manipulation of said mechanical control, said context corresponding to one of said plurality of purposes displayed to said dedicated display means at the time of said user manipulation.

14. The method of claim 13, wherein said step of processing any one of said plurality of values in context to any one of said plurality of purposes for said mechanical control upon recognition of user manipulation of said mechanical control further includes the step of ignoring said plurality of values when said step for dynamically displaying a plurality of purposes for said mechanical control includes displaying a NO-OP purpose.

15. The method of claim 13, wherein said step of dynamically displaying a plurality of purposes for said mechanical control includes the step of rendering a visual image to said dedicated display means.

16. The method of claim 13, wherein said step for dynamically displaying a plurality of purposes for said mechanical control includes the step of communicating a dynamic refresh value in context to one of said plurality of purposes currently displayed to said dedicated display means.

17. The method of claim 16, wherein said dynamic refresh value comprises a graphical image.

18. The method of claim 13, wherein said step of dynamically displaying a plurality of purposes for said mechanical control further includes the step of displaying one of said plurality of purposes as a result of processing by said step of processing any one of said plurality of values in context.

* * * * *